(12) United States Patent
Cho et al.

(10) Patent No.: US 10,116,779 B2
(45) Date of Patent: *Oct. 30, 2018

(54) APPARATUS AND METHOD FOR PROVIDING INCOMING AND OUTGOING CALL INFORMATION IN A MOBILE COMMUNICATION TERMINAL

(71) Applicant: Samsung Electronics Co., Ltd., Gyeonggi-do (KR)

(72) Inventors: Jeong-Sik Cho, Gyeonggi-do (KR); Young-Jip Kim, Gyeonggi-do (KR); Young-Seop Han, Gyeonggi-do (KR); Jun-Young Choe, Gyeonggi-do (KR); Kyung-Shin Lee, Gyeonggi-do (KR); Tae-Soo Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/605,482

(22) Filed: May 25, 2017

(65) Prior Publication Data

US 2017/0264727 A1  Sep. 14, 2017

Related U.S. Application Data

(63) Continuation of application No. 14/991,438, filed on Jan. 8, 2016, which is a continuation of application (Continued)

(30) Foreign Application Priority Data

Dec. 23, 2005  (KR) .................. 10-2005-0128978

(51) Int. Cl.
*H04M 1/00* (2006.01)
*H04B 1/38* (2015.01)
(Continued)

(52) U.S. Cl.
CPC ............. *H04M 1/274583* (2013.01); *H04M 1/274533* (2013.01); *H04M 1/56* (2013.01);
(Continued)

(58) Field of Classification Search
USPC .............. 455/566, 412.1, 412.2, 415, 158.5; 379/207.15, 201.04, 93.23, 428.03,
(Continued)

(56) References Cited

U.S. PATENT DOCUMENTS 5,943,055 A    8/1999  Sylvan
6,389,124 B1 * 5/2002  Schnarel ............. H04M 1/2473
                                                 379/142.01
(Continued)

FOREIGN PATENT DOCUMENTS

CN    1426213    6/2003
CN    1750559    3/2006
(Continued)

OTHER PUBLICATIONS

2002 Palm Tungsten W PDA Phone, "Handbook for Palm Tungsten W Handhelds", Jun. 1, 2017, pp. 112 and 122.

*Primary Examiner* — Edward Urban
*Assistant Examiner* — Rui Hu
(74) *Attorney, Agent, or Firm* — The Farrell Law Firm, P.C.

(57) ABSTRACT

Methods and apparatuses are provided for providing information at an electronic device. Call history information for a phone number is displayed on a display of the electronic device. An option is displayed on the display of the electronic device. The option is either a first option for editing information associated with the phone number or a second option for adding the phone number to an address book based on whether the phone number is in the address book.

18 Claims, 9 Drawing Sheets

Related U.S. Application Data

No. 14/582,659, filed on Dec. 24, 2014, now Pat. No. 9,270,812, which is a continuation of application No. 14/244,547, filed on Apr. 3, 2014, now Pat. No. 8,929,531, which is a continuation of application No. 14/056,360, filed on Oct. 17, 2013, now Pat. No. 8,903,070, which is a continuation of application No. 13/669,101, filed on Nov. 5, 2012, now Pat. No. 8,582,746, which is a continuation of application No. 11/645,442, filed on Dec. 26, 2006, now Pat. No. 8,320,547.

(51) Int. Cl.
| | |
|---|---|
| *H04M 1/2745* | (2006.01) |
| *H04M 1/56* | (2006.01) |
| *H04M 1/57* | (2006.01) |
| *H04M 1/725* | (2006.01) |
| *H04W 4/16* | (2009.01) |
| *H04M 1/663* | (2006.01) |
| *H04M 1/64* | (2006.01) |

(52) U.S. Cl.
CPC ............. *H04M 1/57* (2013.01); *H04M 1/663* (2013.01); *H04M 1/72583* (2013.01); *H04W 4/16* (2013.01); *H04M 1/64* (2013.01); *H04M 2250/60* (2013.01)

(58) Field of Classification Search
USPC .................................................. 379/433.04
See application file for complete search history.

(56) References Cited

U.S. PATENT DOCUMENTS

| | | | | |
|---|---|---|---|---|
| 6,909,910 B2* | 6/2005 | Pappalardo | ..... | H04M 1/274525 455/414.1 |
| 6,975,712 B1* | 12/2005 | Schnarel | ............. | H04M 1/2471 379/142.01 |
| 7,007,239 B1* | 2/2006 | Hawkins | ............. | H04M 1/0254 379/93.23 |
| 7,236,576 B2* | 6/2007 | Schnarel | ............. | H04M 1/2471 379/142.01 |
| 7,266,185 B2* | 9/2007 | Trandal | ............. | H04M 3/42195 379/142.01 |
| 7,526,306 B2* | 4/2009 | Brems | ................ | H04M 1/2745 455/518 |
| 8,320,547 B2* | 11/2012 | Cho | ........................ | H04M 1/56 379/207.15 |
| 8,411,845 B2* | 4/2013 | Bocking | ............... | H04M 1/575 379/355.02 |
| 8,582,746 B2 | 11/2013 | Cho et al. | | |
| 8,676,178 B2* | 3/2014 | Pappalardo | ..... | H04M 1/274525 379/355.05 |
| 8,774,785 B1* | 7/2014 | Kirchhoff | ............... | H04W 4/12 379/210.02 |
| 8,855,722 B2* | 10/2014 | Hawkins | ............... | G06F 1/1632 455/415 |
| 8,903,070 B2 | 12/2014 | Cho et al. | | |
| 8,929,531 B2 | 1/2015 | Cho et al. | | |
| 9,270,812 B2 | 2/2016 | Cho | | |
| 9,413,885 B1* | 8/2016 | Kirchhoff | ............... | H04W 4/12 |
| 9,692,891 B1* | 6/2017 | Kirchhoff | ............. | H04M 3/436 |
| 2003/0148790 A1* | 8/2003 | Pappalardo | ..... | H04M 1/274525 455/558 |
| 2003/0195018 A1 | 10/2003 | Lee | | |
| 2004/0043762 A1* | 3/2004 | Kim | ................... | H04M 1/72547 455/418 |
| 2004/0102225 A1 | 5/2004 | Furuta et al. | | |
| 2005/0085274 A1 | 4/2005 | Lee | | |
| 2005/0129206 A1 | 6/2005 | Martin | | |
| 2005/0143135 A1* | 6/2005 | Brems | ................ | H04M 1/2745 455/564 |
| 2005/0157860 A1* | 7/2005 | Schnarel | ............. | H04M 1/2471 379/142.01 |
| 2005/0182798 A1* | 8/2005 | Todd | ..................... | G06F 3/0482 |
| 2005/0208970 A1* | 9/2005 | Pappalardo | ..... | H04M 1/274525 455/558 |
| 2006/0056606 A1* | 3/2006 | Bocking | ............... | H04M 1/575 379/112.01 |
| 2006/0121938 A1* | 6/2006 | Hawkins | ................ | G06F 1/1632 455/556.1 |
| 2006/0288297 A1* | 12/2006 | Haitani | .................. | G06F 1/1632 715/739 |
| 2007/0064682 A1* | 3/2007 | Adams | ............. | H04L 29/06027 370/352 |
| 2010/0216442 A1* | 8/2010 | Kim | .................... | H04M 1/2745 455/415 |

FOREIGN PATENT DOCUMENTS

| | | |
|---|---|---|
| GB | 2259429 | 10/1993 |
| KR | 1020020096578 | 12/2002 |
| WO | WO 03/056789 | 7/2003 |
| WO | WO 2005/025191 | 3/2005 |

* cited by examiner

APPARATUS AND METHOD FOR PROVIDING INCOMING AND OUTGOING CALL INFORMATION IN A MOBILE COMMUNICATION TERMINAL

PRIORITY

This application is a Continuation Application of U.S. patent application Ser. No. 14/991,438, filed in the U.S. Patent and Trademark Office (USPTO) on Jan. 8, 2016, which is a Continuation Application of U.S. patent application Ser. No. 14/582,659, filed in the USPTO on Dec. 24, 2014, now U.S. Pat. No. 9,270,812, issued on Feb. 23, 2016, which is a Continuation Application of U.S. patent application Ser. No. 14/244,547, filed in the USPTO on Apr. 3, 2014, now U.S. Pat. No. 8,929,531, issued on Jan. 6, 2015, which is a Continuation Application of U.S. patent application Ser. No. 14/056,360, filed in the USPTO on Oct. 17, 2013, now U.S. Pat. No. 8,903,070, issued on Dec. 2, 2014, which is a Continuation Application of U.S. patent application Ser. No. 13/669,101, filed in the USPTO on Nov. 5, 2012, now U.S. Pat. No. 8,582,746, issued on Nov. 12, 2013, which is a Continuation Application of U.S. patent application Ser. No. 11/645,442, filed in the USPTO on Dec. 26, 2006, now U.S. Pat. No. 8,320,547, issued on Nov. 27, 2012, which claims priority under 35 U.S.C. §119(a) to an application filed in the Korean Intellectual Property Office on Dec. 23, 2005 and assigned Serial No. 10-2005-0128978, the contents of each of which are incorporated herein by reference.

BACKGROUND OF THE INVENTION

1. Field of the Invention

The present invention generally relates to a mobile communication terminal, and more particularly to an apparatus and method for providing incoming and outgoing call information in a mobile communication terminal.

2. Description of the Related Art

With the development of communication technology, mobile communication terminals are widely being used. The Mobile communication terminals are communication devices for providing a phone call function while the user is on the move, for example, as mobile phones or personal information terminals.

Mobile communication terminals provide phone call functions and various additional functions. Specifically, mobile communication terminals provide a function for recording and storing incoming and outgoing call information and a function for displaying the incoming and outgoing call information in response to a user request.

For example, mobile communication terminals provide a function for displaying a recent call list of all incoming and outgoing call numbers including recently received call numbers, recently transmitted call numbers, recently missed call numbers and so on in reverse order of incoming and outgoing call occurrence times in response to the user request. Mobile communication terminals also provide a function for displaying a recent incoming call list of recently received call numbers in reverse order of incoming call occurrence times in response to the user request. In addition, mobile communication terminals provide a function for displaying a recent outgoing call list of recently transmitted call numbers in reverse order of outgoing call occurrence times in response to the user request. Mobile communication terminals provide a function for displaying a missed call list of recently missed call numbers in reverse order of missed call occurrence times in response to the user request.

Therefore, users can retrieve recent incoming and outgoing call information through the recent call list, recent incoming call list, recent outgoing call list, and missed call list.

The above-described conventional method for providing incoming and outgoing call information only provides an associated incoming/outgoing call list (e.g., the recent call list, recent incoming call list, recent outgoing call list, missed call list, and so on) on the basis of incoming/outgoing call occurrence times rather than phone numbers. Thus, it is difficult for an incoming/outgoing call history to be viewed at a glance on the basis of call numbers in the conventional method for providing incoming/outgoing call information.

When many incoming/outgoing calls relative to the same phone number occur, the associated phone number is repeatedly displayed many times only according to call occurrence times in the conventional incoming/outgoing call list. In the incoming/outgoing call list in which the number of phone numbers capable of being displayed is limited, other incoming/outgoing call numbers whose number corresponds to the number of repeated phone numbers cannot be displayed. The users may be inconvenienced to view other incoming/outgoing call numbers between repeatedly displayed phone numbers.

In the conventional incoming/outgoing call list, detailed incoming/outgoing call occurrence times relative to the same phone number are separately provided. When a user desires to view detailed incoming/outgoing call information relative to the same phone numbers, the user must select the same phone numbers of the list one by one. For example, when the same phone number is repeatedly displayed on the incoming/outgoing call list many times, the user is inconvenienced because the user must select all the same phone numbers from the first incoming/outgoing call number to the last incoming/outgoing call number one by one in order to view all incoming/outgoing call occurrence times relative to the same phone numbers.

Conventional mobile communication terminals can only store and delete a phone number of the incoming/outgoing call list, but do not provide a menu relative to a phone number of the incoming/outgoing call list. Accordingly, the degree of practical use of the incoming/outgoing call list is low.

SUMMARY OF THE INVENTION

It is, therefore, an object of the present invention to provide an apparatus and method for providing incoming and outgoing call information in a mobile communication terminal that enables the incoming and outgoing call information to be viewed on the basis of phone numbers.

It is another object of the present invention to provide an apparatus and method for providing incoming and outgoing call information in a mobile communication terminal that enables detailed incoming/outgoing call information mapped to the same phone number to be viewed at one time by integrating and providing the detailed incoming/outgoing call information mapped to the same phone number.

It is yet another object of the present invention to provide an apparatus and method for providing incoming and outgoing call information in a mobile communication terminal that can increase the degree of practical use of an incoming/ outgoing call list and improve the convenience of a user by providing various menus relative to a phone number of the incoming/outgoing call list.

In accordance with an aspect of the present invention, an electronic device is provided that includes a memory storing instructions and a processor. The processor is configured to execute the instructions to control to display call history information for a phone number on a display of the electronic device. The processor is also configured to control to display an option on the display of the electronic device, the option being either a first option for editing information associated with the phone number or a second option for adding the phone number to an address book based on whether the phone number is in the address book.

In accordance with another aspect of the present invention, a method is provided for providing information at an electronic device. Call history information for a phone number is displayed on a display of the electronic device. An option is displayed on the display of the electronic device. The option is either a first option for editing information associated with the phone number or a second option for adding the phone number to an address book based on whether the phone number is in the address book.

In accordance with another aspect of the present invention, a non-transitory computer readable recording medium is provided for storing instructions executable by a processor of an electronic device. The instructions cause the processor to control to provide call history information for a phone number on a display of the electronic device. The instructions also cause the processor to control to provide an option on the display of the electronic device, the option being either a first option for editing information associated with the phone number or a second option for adding the phone number to an address book based on whether the phone number is in the address book.

BRIEF DESCRIPTION OF THE DRAWINGS

The above and other objects and aspects of the present invention will be more clearly understood from the following detailed description taken in conjunction with the accompanying drawings, in which.

DETAILED DESCRIPTION OF EMBODIMENTS OF THE PRESENT INVENTION

Preferred embodiments of the present invention will be described in detail herein below with reference to the accompanying drawings. In the drawings, the same or similar elements are denoted by the same reference numerals even though they are depicted in different drawings. In the following description, detailed descriptions of functions and configurations incorporated herein that are well known to those skilled in the art are omitted for clarity and conciseness.

Figure 1:
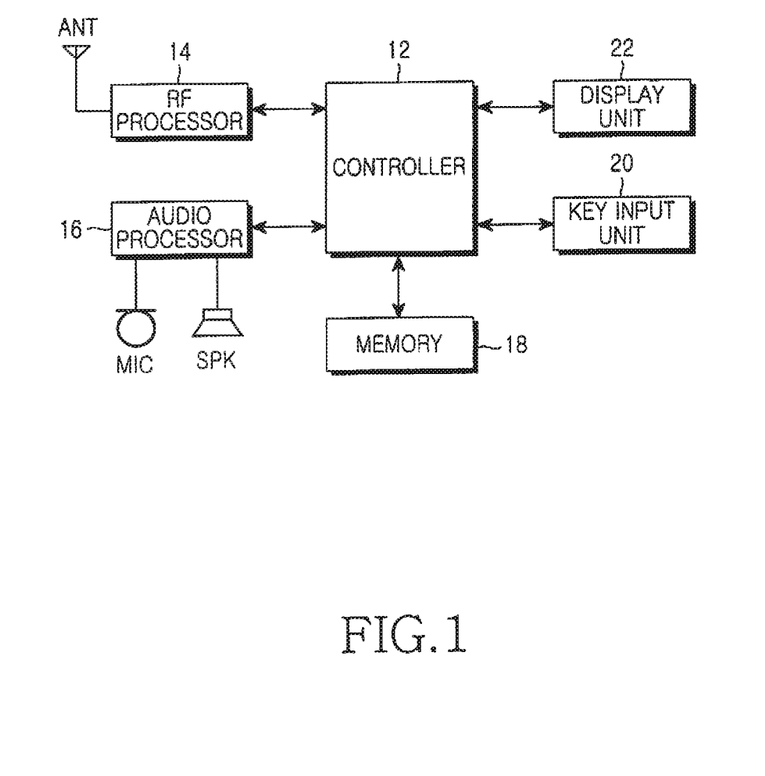
FIG. 1 is a block diagram illustrating a structure of a mobile communication terminal in accordance with the present invention.

FIG. 1 is a block diagram illustrating a structure of a mobile communication terminal in accordance with the present invention. The mobile communication terminal is provided with a controller 12, a Radio Frequency (RF) processor 14, an audio processor 16, a memory 18, a key input unit 20, and a display unit 22.

The controller 12 controls the overall operation of the mobile communication terminal. Specifically, the controller 12 controls an operation for adding detailed incoming/outgoing call information to an associated phone number item of an incoming/outgoing call list when an incoming/outgoing call event occurs and controls an operation for displaying an image of all detailed incoming/outgoing call information integrated for a particular phone number when the particular phone number of the incoming/outgoing call list is selected. Moreover, the controller 12 controls an operation for performing a phone number-related function, for example, an Address Book Register/Edit function or Reception Rejection Register/Release function, in response to a user request in a state in which the image of the detailed incoming/outgoing call information is displayed. The detailed incoming/outgoing call information can include date and time information mapped to an associated phone number as detailed incoming/outgoing call information of the associated phone number.

The RF processor 14 connected to the controller 12 performs a call transmission and reception function by transmitting an RF signal to and receiving an RF signal from a mobile communication base station through an antenna (ANT). That is, the RF processor 14 converts a received RF signal to an Intermediate Frequency (IF) signal, converts the IF signal to an analog baseband signal, converts the analog baseband signal to a digital signal, and applies the digital signal to the controller 12, thereby receiving an incoming call. Moreover, the RF processor 14 converts a digital baseband signal applied from the controller 12 to an analog IF signal, and converts the IF signal to an RF signal, thereby transmitting an outgoing call.

The audio processor 16 is connected to a microphone (MIC) and a speaker (SPK). The audio processor 16 generates data from a voice signal received from the microphone and then outputs the generated data to the controller 12. The audio processor 16 converts voice data input from the controller 12 to audible sound, outputs the audible sound through the speaker, and enables voice communication when an incoming/outgoing call occurs.

The memory 18 is constructed of a Read Only Memory (ROM) for storing information and multiple programs required at the time of controlling the operation of the mobile communication terminal in accordance with the present invention, a Random Access Memory (RAM), a voice memory, and so on. Moreover, the memory 18 is provided with an incoming/outgoing call history database in accordance with the present invention. The memory 18 stores an incoming/outgoing call list, for example, a recent call list, a recent incoming call list, a recent outgoing list, a missed call list, and so on, and stores detailed incoming/outgoing call information mapped to a particular phone number of the incoming/outgoing call list.

The key input unit 20 includes various keys including number keys, and provides key input data from the user to the controller 12. That is, the key input unit 20 outputs unique key input data to the controller 12 according to each input key. The controller 12 detects a key mapped to key input data and then performs an associated operation according to a detection result. The key input unit 20 applies associated key input data to the controller 12 when the user selects a particular phone number item of the incoming/outgoing call list. Moreover, the key input unit 20 applies, to the controller 12, key input data for displaying a phone number-related menu when the user presses a menu key in a state in which an image of the detailed incoming/outgoing call information is displayed.

Under control of the controller 12, the display unit 22 receives and displays key input data or displays an operating state of the mobile communication terminal and various information in the form of icons and characters. In accordance with the present invention, the display unit 22 displays an image of detailed incoming/outgoing call information integrated for a particular phone number item and displays a phone number-related menu in a state in which the image of the detailed incoming/outgoing call information is displayed, under the control of the controller 12.

The mobile communication terminal constructed as described above provides detailed incoming/outgoing call information integrated for a particular phone number, such that the user can view the detailed incoming/outgoing call information mapped to the same phone number at one time. Furthermore, in accordance with the present invention, the mobile communication terminal provides a phone number-related function in an image of detailed incoming/outgoing call information, thereby increasing the degree of practical use of an incoming/outgoing call list and improving convenience of the user.

A method for providing detailed incoming/outgoing call information in the mobile communication terminal in accordance with the present invention will be described in detail with reference to FIG. 2.

Figure 2:
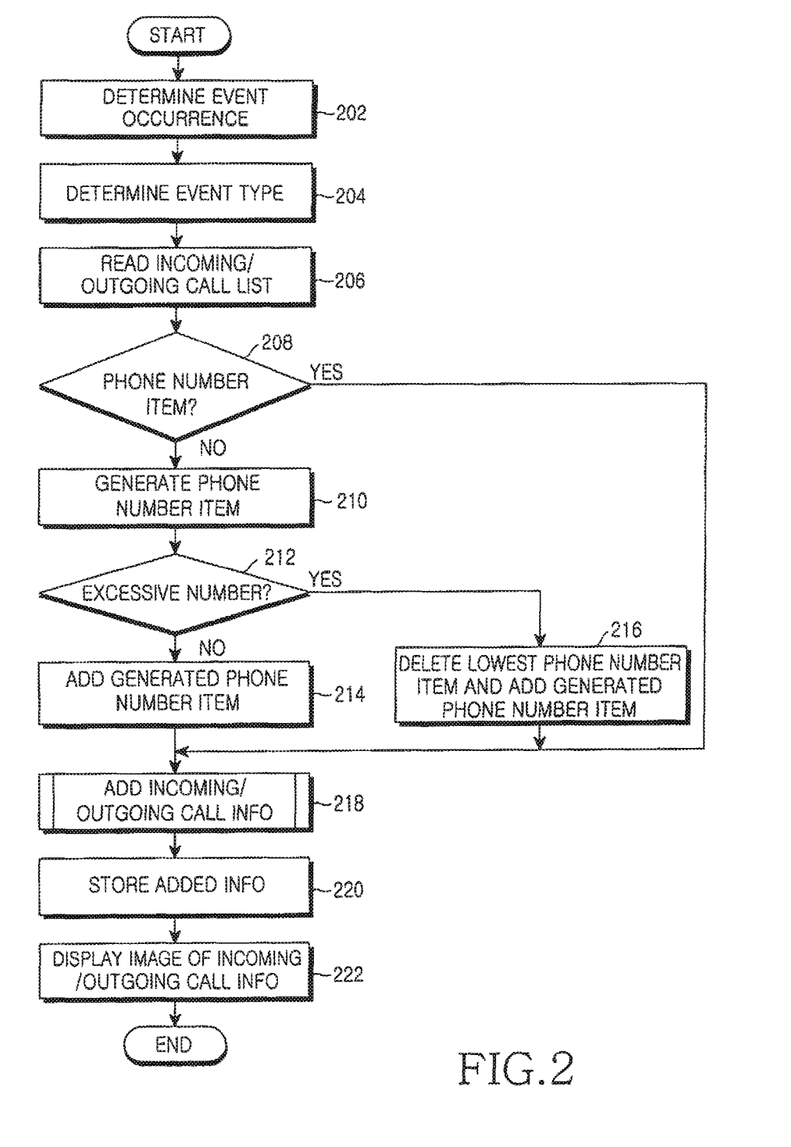
FIG. 2 is a flowchart illustrating a process for providing detailed incoming/outgoing call information in the mobile communication terminal in accordance with the present invention.

Referring to FIG. 2, the mobile communication terminal determines whether an incoming/outgoing call event has occurred in step 202. For example, the mobile communication terminal determines whether the incoming/outgoing call event has occurred by checking an incoming/outgoing call through the RF processor 14.

When the incoming/outgoing call event has occurred, the mobile communication terminal determines a type of the incoming/outgoing call event in step 204. At this time, the incoming/outgoing call event type may be an outgoing call, an incoming call, a missed call, or so on.

In step 206, the mobile communication terminal reads an incoming/outgoing call list from the incoming/outgoing call history database of the memory 18. For example, the mobile communication terminal reads a recent call list and a list mapped to the incoming/outgoing call event type from the incoming/outgoing call history database of the memory 18.

When the incoming/outgoing call event type is an outgoing call, the mobile communication terminal reads a recent outgoing call list. When the incoming/outgoing call event type is an incoming call, the mobile communication terminal reads a recent incoming call list. When the incoming/outgoing call event type is a missed call, the mobile communication terminal reads a missed call list.

In step 208, the mobile communication terminal determines whether a phone number item relative to the incoming/outgoing call event is present in the incoming/outgoing call list. At this time, the phone number item can be displayed as a name mapped to an associated phone number. Each phone number item has detailed incoming/outgoing call information mapped to an associated phone number in a lower item.

If an associated phone number item is present in the incoming/outgoing call list, the mobile communication terminal proceeds to step 218 to add detailed incoming/outgoing call information mapped to the incoming/outgoing call event to the associated phone number item.

However, if an associated phone number item is absent in the incoming/outgoing call list, the mobile communication terminal generates a phone number item relative to the incoming/outgoing call event in step 210. The incoming/outgoing call list includes a limited number of phone number items. Thus, the mobile communication terminal determines whether the number of phone number items of the incoming/outgoing call list exceeds a limit number in step 212.

If the number of phone number items does not exceed the limit number, the mobile communication terminal updates the number of phone number items of the incoming/outgoing call list and adds the generated phone number item in step 214. However, if the number of phone number items exceeds the limit number, the mobile communication terminal deletes the lowest phone number item of the incoming/outgoing call list and adds the generated phone number item in step 216.

Then, the mobile communication terminal proceeds to step 218 to add detailed incoming/outgoing call information mapped to the incoming/outgoing call event to the phone number item. Herein, the detailed incoming/outgoing call information is incoming/outgoing call information mapped to an associated phone number to be provided in detail and can include date and time information about an incoming/outgoing call.

A process for adding detailed incoming/outgoing call information in step 218 will be described with reference to the flowchart of FIG. 3.

Figure 3:
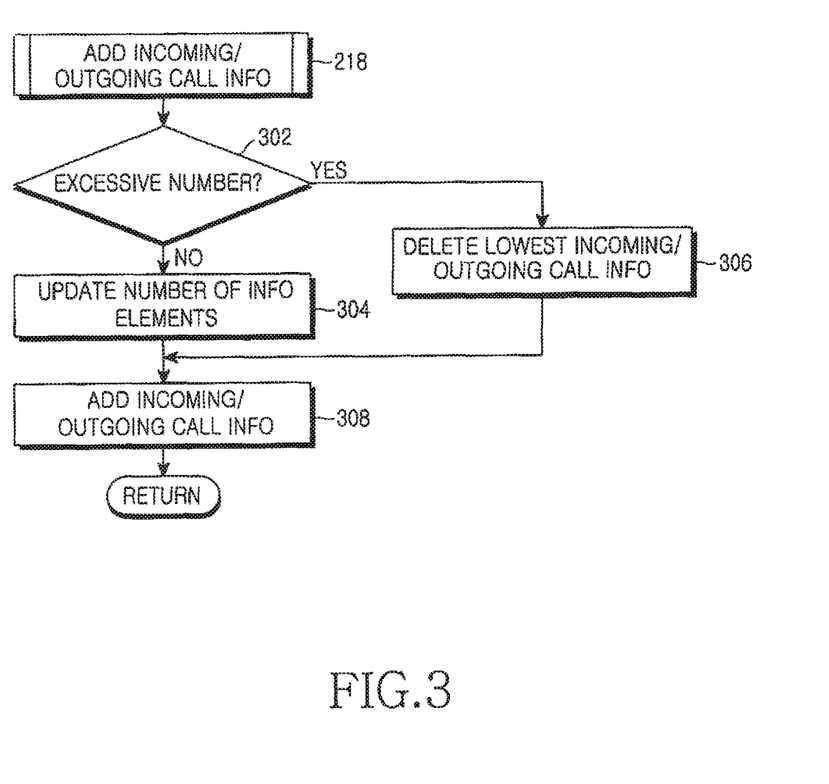
FIG. 3 is a flowchart illustrating a process for adding detailed incoming/outgoing call information in the mobile communication terminal in accordance with the present invention.

Referring to FIG. 3, the mobile communication terminal determines whether the number of detailed incoming/outgoing call information elements mapped to a phone number item exceeds a limit number in step 302.

If the number of detailed incoming/outgoing call information elements mapped to the associated phone number item does not exceed the limit number, the mobile communication terminal updates the number of detailed incoming/outgoing call information elements in step 304.

However, if the number of detailed incoming/outgoing call information elements mapped to the phone number item exceeds the limit number, the mobile communication terminal deletes the lowest detailed incoming/outgoing call information from prestored detailed incoming/outgoing call information in step 306. At this time, the lowest detailed incoming/outgoing call information is detailed incoming/outgoing call information stored for the longest time.

The mobile communication terminal then proceeds to step 308 to add detailed incoming/outgoing call information to an associated phone number item. The mobile communication terminal returns to the process of FIG. 2 after adding the detailed incoming/outgoing call information in steps 302 to 308 of FIG. 3.

Then, the mobile communication terminal proceeds to step 220 of FIG. 2 to store the added information in the incoming/outgoing call history database. The mobile communication terminal then displays an image of detailed incoming/outgoing call information mapped to a particular phone number item in response to a user request in step 222. That is, when the user selects the particular phone number item of an incoming/outgoing call list, the mobile communication terminal displays the image in which all detailed incoming/outgoing call information mapped to the selected phone number is integrated.

An incoming/outgoing call list and an image of detailed incoming/outgoing call information mapped to a phone number item thereof in accordance the present invention will be described in detail with reference to FIGS. 4 and 5.

Figures 4A, 4B:
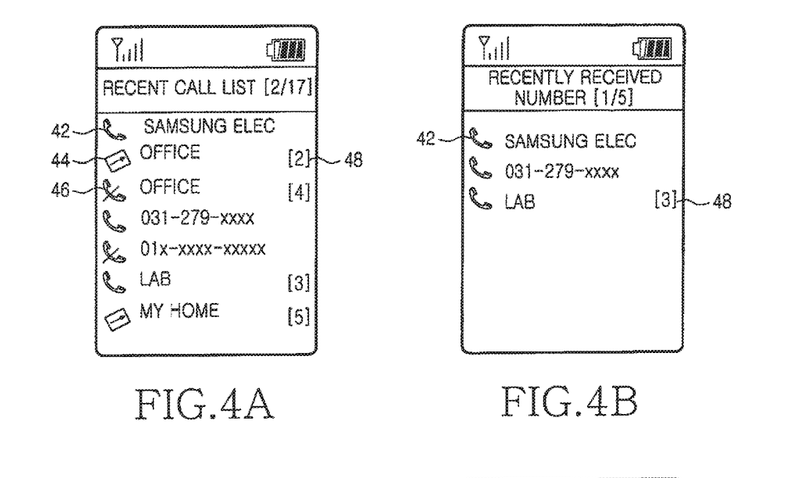
FIGS. 4(A)-4(D) illustrate an example of an image of an incoming/outgoing call list in accordance with the present invention.
Figures 4C, 4D:
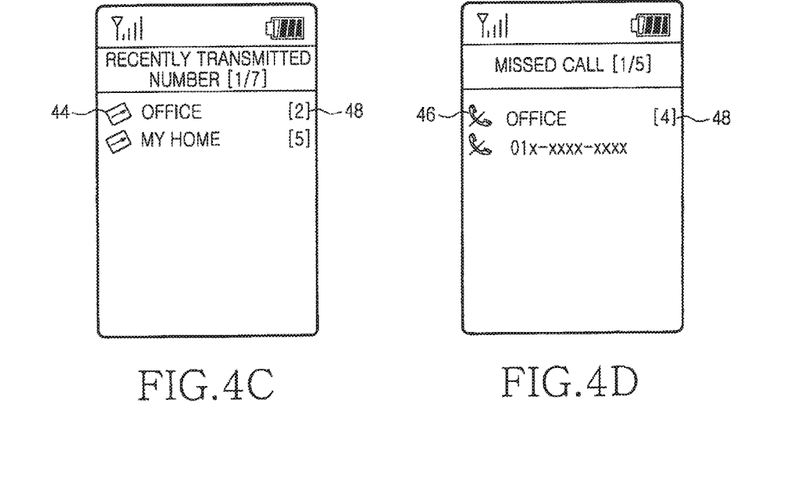

FIGS. 4(A)-4(D) illustrate an example of an image of an incoming/outgoing call list in accordance with the present invention. FIG. 4(A) illustrates a recent call list. Referring to FIG. 4(A), the recent call list includes, for example, phone number items relative to all recently occurred incoming/outgoing events including a recent incoming call, a recent outgoing call, and a missed call. FIG. 4(B) illustrates a recent incoming call list. Referring to FIG. 4(B), the recent incoming call list includes recently received phone numbers. FIG. 4(C) illustrates a recent outgoing call list. Referring to FIG. 4(C), the recent outgoing call list includes recently transmitted phone numbers. FIG. 4(D) illustrates a missed call list. Referring to FIG. 4(D), the missed call list includes phone numbers of missed calls.

Referring to FIGS. 4(A) to 4(D), icons for indicating incoming/outgoing call event types are displayed in phone number items. The icons for indicating the incoming/outgoing call event types may be an icon 42 for indicating a recently received phone number, an icon 44 for indicating a recently transmitted phone number, and an icon 46 for indicating a phone number of a missed call. A phone number item can be displayed in the form of a name mapped to an associated phone number when the name is prestored. When the prestored name is not present, the associated phone number can be displayed. Each phone number item has detailed incoming/outgoing call information mapped to an associated phone number as a lower item. As indicated by reference numeral 48, the number of detailed incoming/outgoing call information elements present in the lower item is displayed along with the phone number item.

When the user selects a particular phone number from the phone number items displayed as described above, the mobile communication terminal displays an image of detailed incoming/outgoing call information mapped to the lower item of the selected phone number item.

Figure 5A:
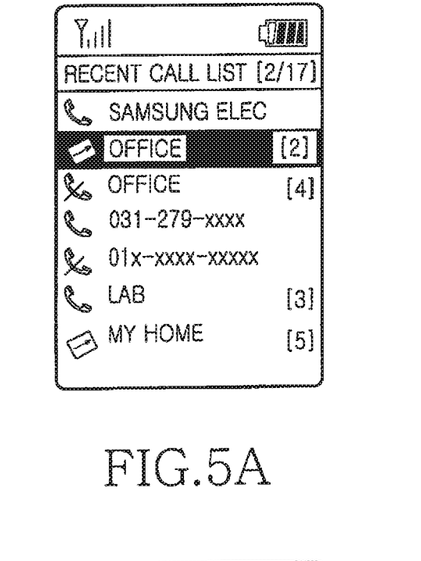
FIGS. 5(A)-5(B) illustrate an example of an image of detailed incoming/outgoing call information in accordance with the present invention.
Figure 5B:
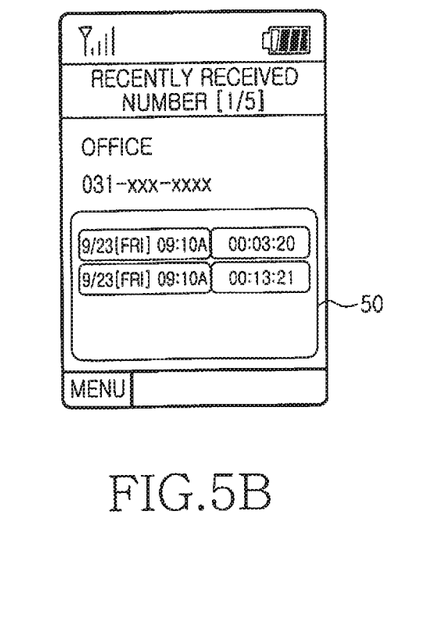

FIGS. 5(A)-5(B) illustrate an example of an image of detailed incoming/outgoing call information in accordance of the present invention. FIG. 5(A) illustrates a recent call list. The user can select each phone number item from the recent call list as illustrated in FIG. 5(A). FIG. 5(A) corresponds to the case where "Office" is selected. When a phone number item such as "Office" is selected, the mobile communication terminal displays an image 50 of detailed incoming/outgoing call information as illustrated in FIG. 5(B). The image 50 is displayed in which all date and time information of incoming/outgoing calls is integrated for the selected phone number item.

This image of detailed incoming/outgoing call information enables the user to view all detailed incoming/outgoing call information mapped to a particular phone number item of the incoming/outgoing call list at a glance.

In accordance with the present invention, the mobile communication terminal provides a phone number-related menu in a state in which an image of incoming/outgoing call information is displayed and performs a function based on menu selection by the user.

Figure 6:
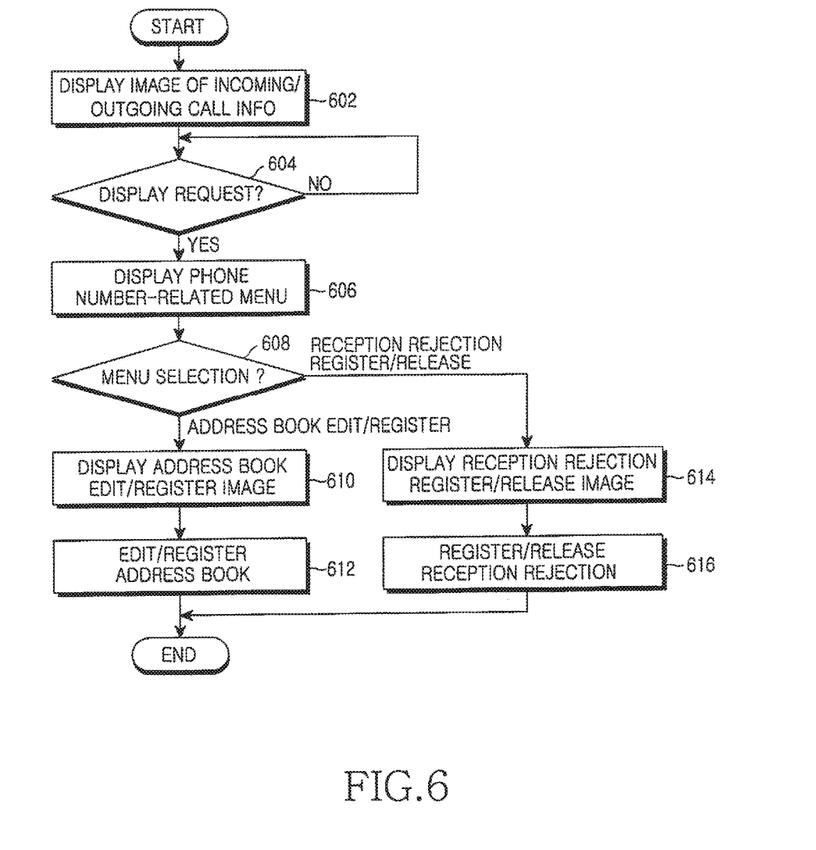
FIG. 6 is a flowchart illustrating a process for performing a phone number management function in an image for displaying incoming/outgoing call event information in accordance with the present invention.

FIG. 6 is a flowchart illustrating a process for performing a phone number-related function in an image for displaying detailed incoming/outgoing call information in accordance with the present invention. Referring to FIG. 6, the mobile communication terminal displays an image of detailed incoming/outgoing call information mapped to a phone number item selected by the user in step 602.

The mobile communication terminal determines whether the user makes a request for displaying a phone number-related menu in step 604. At this time, the mobile communication terminal can determine that the request for displaying the phone number-related menu is present when, for example, a menu key is input through the key input unit 22.

When the request for displaying the phone number-related menu is present, the mobile communication terminal displays the phone number-related menu on the image of detailed incoming/outgoing call information in step 606. The phone number-related menu may be an address book menu, a reception rejection menu, and so on.

A method for displaying the address book menu will be described with reference to the example FIGS. 7(A)-7(B).

Figure 7A:
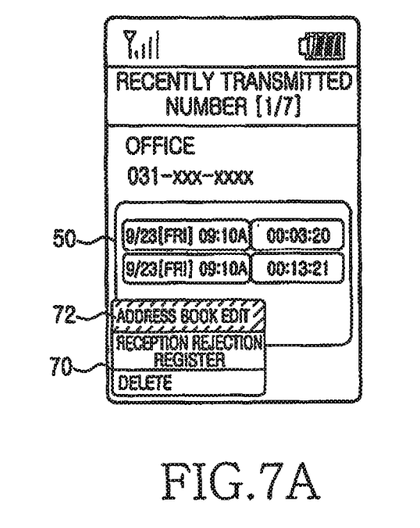
FIGS. 7(A)-7(B) illustrate an example of displaying an address book menu in accordance with the present invention.

FIG. 7(A) displays a phone number-related menu 70 in a state in which an image 50 of detailed incoming/outgoing call information mapped to "Office" of a recent outgoing call list is displayed. When a previously registered name (e.g., "Office") mapped to a phone number is present in the currently displayed image of detailed incoming/outgoing call information as illustrated in FIG. 7(A), the mobile communication terminal determines that an associated address book is present, and displays an "Address Book Edit" option 72 in the address book menu mapped to the phone number-related menu 70.

Figure 7B:
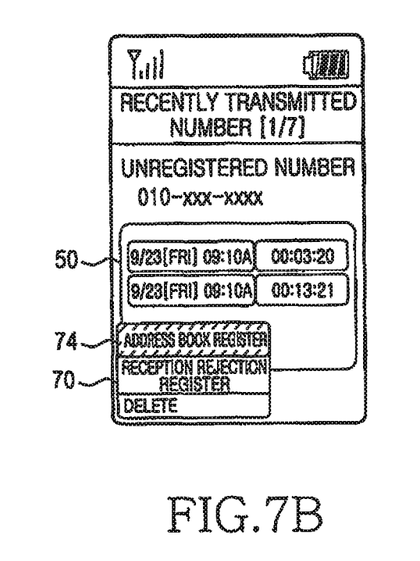

FIG. 7(B) displays a phone number-related menu 70 in a state in which an image 50 of incoming/outgoing call information for "Unregistered Number" of the recent outgoing call list is displayed. When a previously registered name mapped to the phone number is absent in the currently displayed image of detailed incoming/outgoing call information as illustrated in FIG. 7(B), the mobile communication terminal determines that an associated address book is absent, and displays an "Address Book Register" option 74 in the address book menu of the phone number-related menu 70.

A method for displaying the reception rejection menu will be described with reference to the example of FIGS. 8(A)-8(B).

Figure 8A:
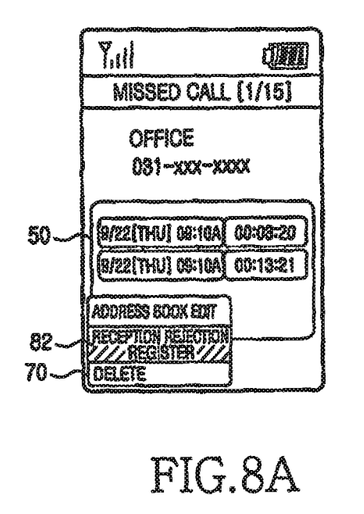
FIGS. 8(A)-8(B) illustrate an example of displaying a reception rejection menu in accordance with the present invention.

FIG. 8(A) displays a phone number-related menu 70 in a state in which an image 50 of detailed incoming/outgoing call information mapped to "Office" of a missed call list is displayed. When reception rejection for a phone number is not registered in the currently displayed image of detailed incoming/outgoing call information, the mobile communication terminal displays a "Reception Rejection Register" option 82 in the reception rejection menu of the phone number-related menu 70 as illustrated in FIG. 8(A).

Figure 8B:
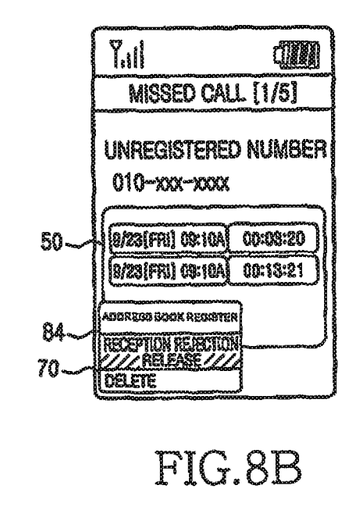

FIG. 8(B) displays a phone number-related menu 70 in a state in which an image 50 of incoming/outgoing call information for "Unregistered Number" of the missed call list is displayed. When reception rejection for the phone number is registered in the currently displayed image of detailed incoming/outgoing call information, the mobile communication terminal displays a "Reception Rejection Release" option 84 in the reception rejection menu of the phone number-related menu 70 as illustrated in FIG. 8(B).

Referring back to FIG. 6, after the phone number-related menu is displayed in the image of detailed incoming/outgoing call information, the mobile communication terminal determines whether the user's menu selection is present in step 608. For example, the mobile communication terminal determines whether an Address Book Register or Edit option is selected or a Reception Rejection Register or Release option is selected.

When the Address Book Register or Edit option is selected, the mobile communication terminal displays an Address Book Register or Edit image in step 610. In step 612, an Address Book Register or Edit operation for an associated phone number is performed.

When the Reception Rejection Register or Release option is selected, the mobile communication terminal displays a Reception Rejection Register or Release image in step 614. In step 616, a Reception Rejection Register or Release operation for an associated phone number is performed.

When the reception rejection is registered through an image of a phone number-related menu in the image of detailed incoming/outgoing call information, the mobile communication terminal performs a reception rejection function.

Figure 9:
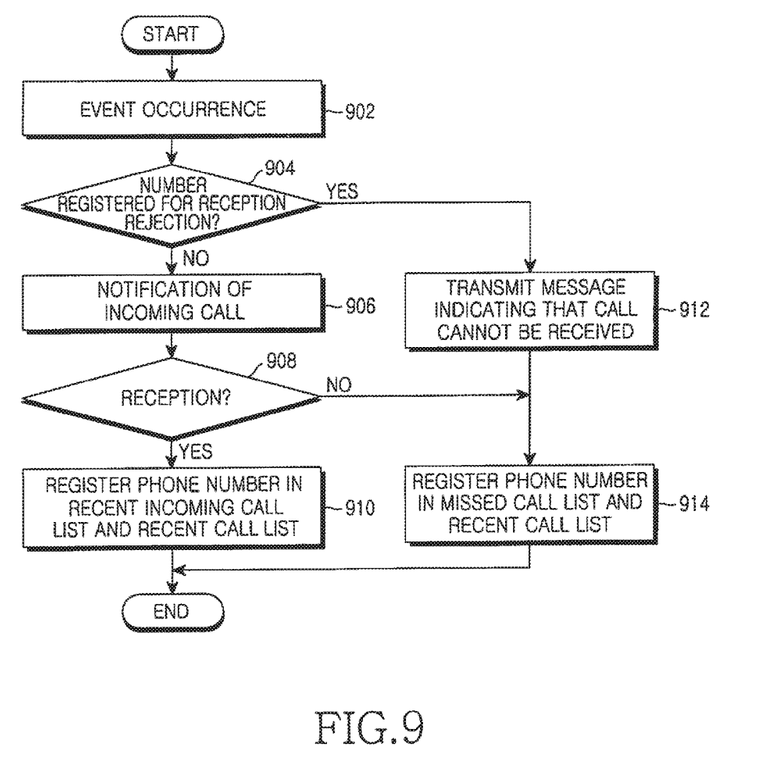
FIG. 9 is a flowchart illustrating a process for performing a reception rejection function in accordance with the present invention.

FIG. 9 is a flowchart illustrating a process for performing a reception rejection function in accordance with the present invention. Referring to FIG. 9, the mobile communication terminal determines whether an incoming/outgoing call event occurs in step 902. When the incoming/outgoing call event occurs, the mobile communication terminal determines whether a phone number relative to the occurred incoming/outgoing call event is registered for reception rejection in step 904.

If the phone number is not registered for reception rejection, the mobile communication terminal gives notification of an incoming call through a ring tone or vibration in step 906. Then, the mobile communication terminal determines whether the user receives the incoming call in step 908. If the user receives the incoming call, the mobile communication terminal registers the phone number in the recent call list and the recent incoming call list in step 910.

However, if the phone number is registered for reception rejection, the mobile communication terminal transmits, to a transmitting side, a message for indicating that a phone call cannot be received in step 912. Then, the mobile communication terminal registers the associated phone number in the recent call list and the missed call list in step 914.

As described above, the present invention enables the detailed incoming and outgoing call information mapped to the same phone number to be viewed at one time by integrating and providing detailed incoming/outgoing call information mapped to a particular phone number.

The present invention can increase the degree of practical use of an incoming/outgoing call list by providing a phone number-related function in an image of detailed incoming/outgoing call information. Moreover, the present invention improves the convenience of a user by performing an Address Book Register or Edit function and a Reception Rejection Register or Release function in an image of detailed incoming/outgoing call information.

Although exemplary embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

What is claimed is:

1. An electronic device, comprising:
a display;
a memory storing instructions; and
a processor configured to execute the stored instructions to at least:
control the display to display a plurality of call entries including incoming call entries and outgoing call entries corresponding to a plurality of phone numbers; and
based on receiving a selection of one of the plurality of call entries that corresponds to a phone number:
control the display to display: (i) a first option for modifying prestored information associated with the phone number corresponding to the one of the plurality of call entries, without displaying a second option for adding the phone number to an address book, and (ii) a third option for unblocking a call from the phone number, when the phone number is in the address book and registered for blocking the call from the phone number, wherein the prestored information associated with the phone number corresponding to the one of the plurality of call entries includes a name for the phone number,
control the display to display: (i) the second option, without displaying the first option, and (ii) the third option, when the phone number is not in the address book and is registered for blocking the call from the phone number,
control the display to display: (i) the first option, without displaying the second option, and (ii) a fourth option for blocking a call from the phone number, when the phone number is in the address book and is not registered for blocking the call from the phone number, and
control the display to display: (i) the second option, without displaying the first option, and (ii) the fourth option, when the phone number is not in the address book and is not registered for blocking the call from the phone number.

2. The electronic device of claim 1, wherein the processor is, further configured to execute the stored instructions to:
based on receiving the selection of the one of the plurality of call entries, control the display to display call history information for the phone number corresponding to the one of the plurality of call entries.

3. The electronic device of claim 2, wherein the call history information for the phone number includes incoming call information of the phone number and outgoing call information of the phone number.

4. The electronic device of claim 1, wherein the processor is further configured to execute the stored instructions to:
based on receiving the selection of the one of the plurality of call entries, control the display to display call history information for the phone number corresponding to the one of the plurality of call entries together with one of the first option and the second option, based on whether the phone number is in the address book.

5. The electronic device of claim 4, wherein the call history information for the phone number includes incoming call information of the phone number and outgoing call information of the phone number.

6. The electronic device of claim 1, wherein one of the incoming call entries and the outgoing call entries includes the phone number and a number in parentheses following the phone number, and
wherein the number in parentheses indicates how many calls have been made, received, or missed for the phone number.

7. A method of providing information, at an electronic device, the method comprising:
displaying, on a display of the electronic device, a plurality of call entries including incoming call entries and outgoing call entries corresponding to a plurality of phone numbers; and
based on receiving a selection of one of the plurality of call entries that corresponds to a phone number:
displaying, on the display of the electronic device: (i) a first option for modifying prestored information associated with the phone number corresponding to the one of the plurality of call entries, without displaying a second option for adding the phone number to the address book, and (ii) a third option for unblocking a call from the phone number, when the phone number is in the address book and registered for blocking the call from the phone number, wherein the prestored information associated with the phone number corresponding to the one of the plurality of call entries includes a name for the phone number, and
displaying, on the display of the electronic device: (i) the second option, without displaying the first option, and (ii) the third option, when the phone number is not in the address book and is registered for blocking the call from the phone number
displaying, on the display of the electronic device: (i) the first option, without displaying the second option, and (ii) a fourth option for blocking a call from the phone number, when the phone number is in the address book and is not registered for blocking the call from the phone number, and
displaying, on the display of the electronic device: (i) the second option, without displaying the first option, and (ii) the fourth option, when the phone number is not in the address book and is not registered for blocking the call from the phone number.

8. The method of claim 7, further comprising:
based on receiving the selection of the one of the plurality of call entries, displaying, on the display of the electronic device, call history information for the phone number corresponding to the one of the plurality of call entries.

9. The method of claim 8, wherein the call history information for the phone number includes incoming call information of the phone number and outgoing call information of the phone number.

10. The method of claim 7, further comprising:
based on receiving the selection of the one of the plurality of call entries, displaying, on the display of the electronic device, call history information for the phone number corresponding to the one of the plurality of call entries together with one of the first option and the second option, based on whether the phone number is in the address book.

11. The method of claim 10, wherein the call history information for the phone number includes incoming call information of the phone number and outgoing call information of the phone number.

12. The method of claim 7, wherein one of the incoming call entries and the outgoing call entries includes the phone number and a number in parentheses following the phone number, and
wherein the number in parentheses indicates how many calls have been made, received, or missed for the phone number.

13. A non-transitory computer readable recording medium storing instructions executable by a processor of an electronic device to cause the processor to at least:
control to provide, on a display of the electronic device, a plurality of call entries including incoming call entries and outgoing call entries corresponding to a plurality of phone numbers; and
based on receiving a selection of one of the plurality of call entries that corresponds to a phone number:
control to provide, on the display of the electronic device: (i) a first option for modifying prestored information associated with the phone number corresponding to the one of the plurality of call entries, without providing a second option for adding the phone number to the address book, and (ii) a third option for unblocking a call from the phone number, when the phone number is in the address book and registered for blocking the call from the phone number, wherein the prestored information associated with the phone number corresponding to the one of the plurality of call entries includes a name for the phone number, and
control to provide, on the display of the electronic device: (i) the second option, without providing the first option, and (ii) the third option, when the phone number is not in the address book and is registered for blocking the call from the phone number,
control to provide, on the display of the electronic device: (i) the first option, without displaying the second option, and (ii) a fourth option for blocking a call from the phone number, when the phone number is in the address book and is not registered for blocking the call from the phone number, and
control to provide, on the display of the electronic device: (i) the second option, without displaying the first option, and (ii) the fourth option, when the phone number is not in the address book and is not registered for blocking the call from the phone number.

14. The non-transitory computer readable recording medium of claim 13, wherein the instructions further cause the processor to:
based on receiving the selection of the one of the plurality of call entries, control to provide, on the display of the electronic device, call history information for the phone number corresponding to the one of the plurality of call entries.

15. The non-transitory computer readable recording medium of claim 14, wherein the call history information for the phone number includes incoming call information of the phone number and outgoing call information of the phone number.

16. The non-transitory computer readable recording medium of claim 13, wherein the instructions further cause the processor to:

based on receiving the selection of the one of the plurality of call entries, control to provide, on the display of the electronic device, call history information for the phone number corresponding to the one of the plurality of call entries together with one of the first option and the second option, based on whether the phone number is in the address book.

17. The non-transitory computer readable recording medium of claim 16, wherein the call history information for the phone number includes incoming call information of the phone number and outgoing call information of the phone number.

18. The non-transitory computer readable recording medium of claim 13, wherein one of the incoming call entries and the outgoing call entries includes the phone number and a number in parentheses following the phone number, and wherein the number in parentheses indicates how many calls have been made, received, or missed for the phone number.

\* \* \* \* \*